(12) United States Patent
Mitzutani et al.

(10) Patent No.: US 6,280,837 B1
(45) Date of Patent: *Aug. 28, 2001

(54) RESIN MOLDED ARTICLE

(75) Inventors: Haruyasu Mitzutani, Ama-gun; Junji Koizumi, Nagoya; Katsushi Ito, Nakashima-gun; Masato Kobayashi; Mitsuhiro Isomichi, both of Takatsuki, all of (JP)

(73) Assignee: Toyoda Gosei Co., Ltd., Aichi-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/940,983

(22) Filed: Sep. 30, 1997

(30) Foreign Application Priority Data

Sep. 30, 1996 (JP) ..................................................... 8-280065

(51) Int. Cl.$^7$ .............................. B32B 5/16; B32B 18/00; B60R 13/00
(52) U.S. Cl. ............................ 428/323; 428/31; 428/324; 264/108; 264/328.12; 264/328.18
(58) Field of Search ..................................... 428/323, 324, 428/325, 31; 264/328.18, 328.12, 108

(56) References Cited

U.S. PATENT DOCUMENTS

| | | | |
|---|---|---|---|
| 4,544,600 | * 10/1985 | Kern | 428/323 |
| 4,598,020 | * 7/1986 | Panush | 428/411.1 |
| 5,177,124 | * 1/1993 | Questel et al. | 523/219 |
| 5,229,175 | * 7/1993 | Seabolt | 428/31 |
| 5,496,630 | * 3/1996 | Hawrylko et al. | 428/328 |
| 5,593,773 | * 1/1997 | McKay et al. | 428/328 |
| 5,800,912 | * 9/1998 | Ogiso et al. | 428/323 |
| 6,068,896 | * 5/2000 | Manabe et al. | 428/31 |

FOREIGN PATENT DOCUMENTS

| | | |
|---|---|---|
| 51-49264 | 4/1976 | (JP) . |
| 60-152543 | 8/1985 | (JP) . |
| 61-138652 | 6/1986 | (JP) . |
| 62-84142 | 4/1987 | (JP) . |
| 1-301748 | 12/1989 | (JP) . |
| 1-308441 | 12/1989 | (JP) . |
| 2-214747 | 8/1990 | (JP) . |
| 2-255842 | 10/1990 | (JP) . |
| 4-7363 | 1/1992 | (JP) . |
| 5-278099 | 10/1993 | (JP) . |

* cited by examiner

Primary Examiner—Paul Thibodeau
Assistant Examiner—Ramsey Zacharia
(74) Attorney, Agent, or Firm—Pillsbury Winthrop LLP

(57) ABSTRACT

The object of the present invention is to provide a colored resin composition having a uniform glitter feeling, which can prevent flow mark formation. In a resin composition molded by using a thermoplastic resin composition in which glitter material is mixed into a synthetic resin, said resin molded article must have a molding ratio L/T is not less than 100, wherein T is the thickness of the molded article and L is a distance from a gate position at molding to a remotest position on the molded article, and wherein said glitter material has average particle size d of 10 $\mu$m<d≦200 $\mu$m.

8 Claims, 3 Drawing Sheets

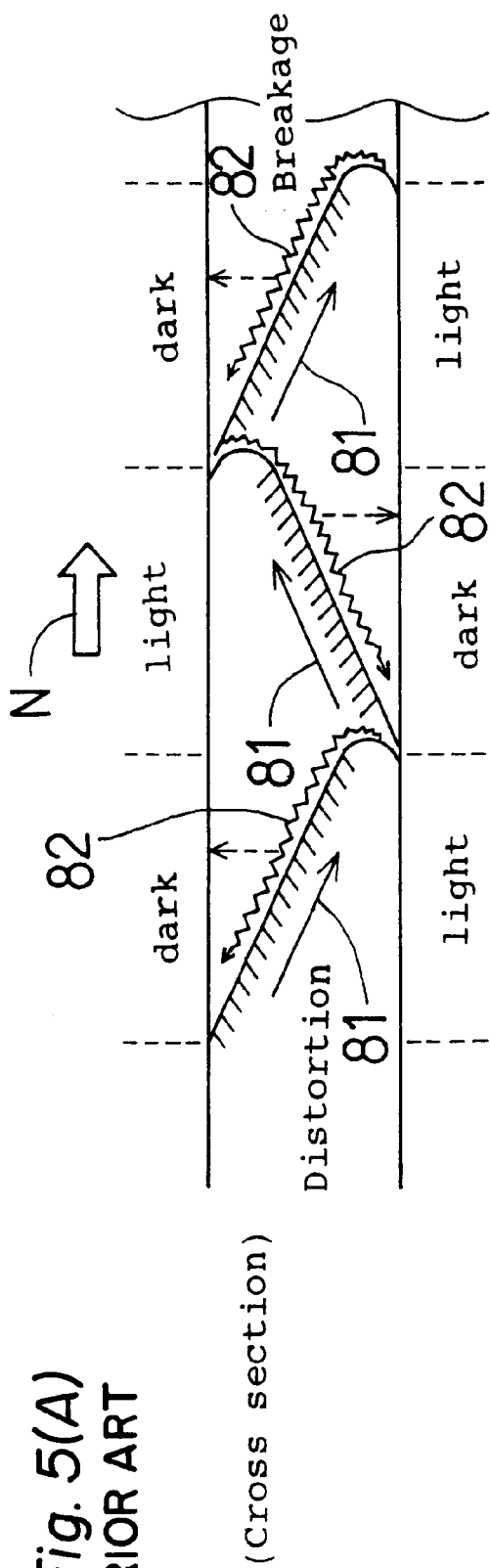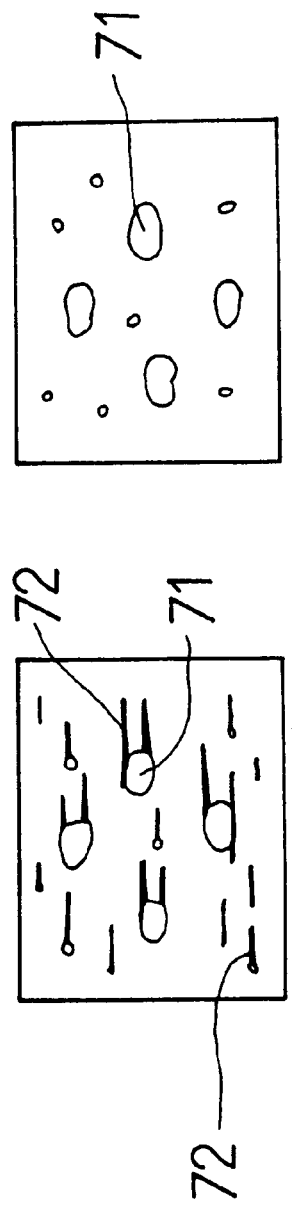
Fig. 5(A) PRIOR ART
Fig. 5(B) PRIOR ART

RESIN MOLDED ARTICLE

BACKGROUND OF THE INVENTION

1. Field of the Invention

The present invention relates to a resin molded article which can prevent formation of a flow mark also known as a flow pattern.

2. Background Information

Previously, painting was used in order to give a resin molded article, such as thermoplastic resin, a uniform and aesthetically pleasing appearance like metallic tone and pearl tone having a deep feeling.

However, such painting required cumbersome and complicated steps, such as degreasing and washing; primecoating, intercoating and overcoating; and dust removing, drying and stoving of the surface of the molded article. Further, painting required facilities and paints, and the steps required a longer cycle time. Thus, painting was mainly responsible for higher costs.

To avoid such problems, molding has been carried out using a thermoplastic resin composition. In this thermoplastic resin composition, a metallic piece, glitter material and a colorant are directly mixed into a synthetic resin. The metallic piece, such as scaly-aluminum powders, acts as an agent which imparts metallic or pearl tone. An example of the glitter material is pearlescent pigment made of mica. A molded article using such a thermoplastic resin composition is referred to as a resin molded article.

As shown in FIG. 2 however, at the molding of the resin molded article 9, a flow mark 8 can occur in some cases at a downstream side of the resin flow, where the downstream side is near a molded article end 92 remote from a gate position 91 at molding. Such a flow mark 8 occurs along with the resin flow in a shape substantially similar to the letter "U", as shown in FIGS. 2 and 3.

Since the flow mark 8 deteriorates the decorative effect of the molded article, the present inventors have studied extensively to prevent the formation of such a flow mark. The present inventors have found that the flow mark is primarily composed of relatively dark portions and relatively light portions, alternating from one to another at a remote location from the gate position, as shown in FIG. 3. The present inventors have further discovered that the flow mark generally is not easily formed in a case where the color of the molded article is concentrated, whereas the flow mark is easily formed where the color of the molded article is pale color or colorless. Moreover, as the amount of the glitter material added increases, the likelihood of the flow mark formation increases also, as conceptionally illustrated in FIG. 4.

The present inventor's study of the mechanism of the formation of the flow mark has revealed that the flowing state at the front portion of the flow becomes unstable due to the fact that the rate of the resin flow is reduced at the downstream side in a cavity near an end of the molded article in the flow direction N, as shown in FIG. 5(A). For this reason, flow distortion 81 occurs causing the breakage 82 at the front portion of the flow. The "dark portion" is formed in the breakage portion 82 where adhesion to the cavity surface is lowered which generates a concave and convex portion on the surface.

As shown in FIG. 5(B), on the surface of the molded article having the flow mark, multiple linear grooves 72 can be observed at the dark portion. On the other hand, at the light portion, such linear groove 72 is not formed. Glitter material 71 is in the interior of the molded article. Also shown in FIG. 5(B) are the flow distortion and breakage at the front portion of the flow, which are formed at the downstream side in the resin flow direction N.

Subsequently, the present inventors have studied adjustment of injection pressure for a thermoplastic resin composition, adjustment of a rate of the resin flow, and other factors in order to prevent the flow mark from occurring. However, the molding conditions were difficult, and thus obtained no sufficient results.

SUMMARY OF THE INVENTION

An object of the present invention is to provide a resin molded article having a uniform glitter feel, which can prevent formation of a flow mark.

The invention provides a resin molded article obtainable by molding using a thermoplastic resin composition in which glitter material is mixed into a synthetic resin. The resin molded article has a molding ratio L/T of not less than 100, wherein T is the thickness of the molded article and L is the distance from a gate position at molding to the remotest position on the molded article. The glitter material has an average particle size d of about $10\ \mu m < d \leq 200\ \mu m$.

According to the present invention, in a resin molded article having the molding ratio L/T of not less than 100, the average particle size d of the glitter material to be added to a synthetic resin, is greater than $10\ \mu m$ and not less than equal to $200\ \mu m$. For this reason, the glitter does not cause deviation in a molded article at molding, and the distortion and breakage of flow at the front portion of the flow are prevented. Therefore, the flow mark is not formed, thereby giving a uniform glittering feel.

The present invention's objects, features and advantages are elucidated by the following detailed description and drawings.

BRIEF DESCRIPTION OF THE DRAWINGS

FIG. 5 is (A) an illustration of the resin flow and mechanism on flow mark formation and (B) an illustration of the surface state in the prior art resin molded article.

DETAILED DESCRIPTION OF THE INVENTION

Figure 1:
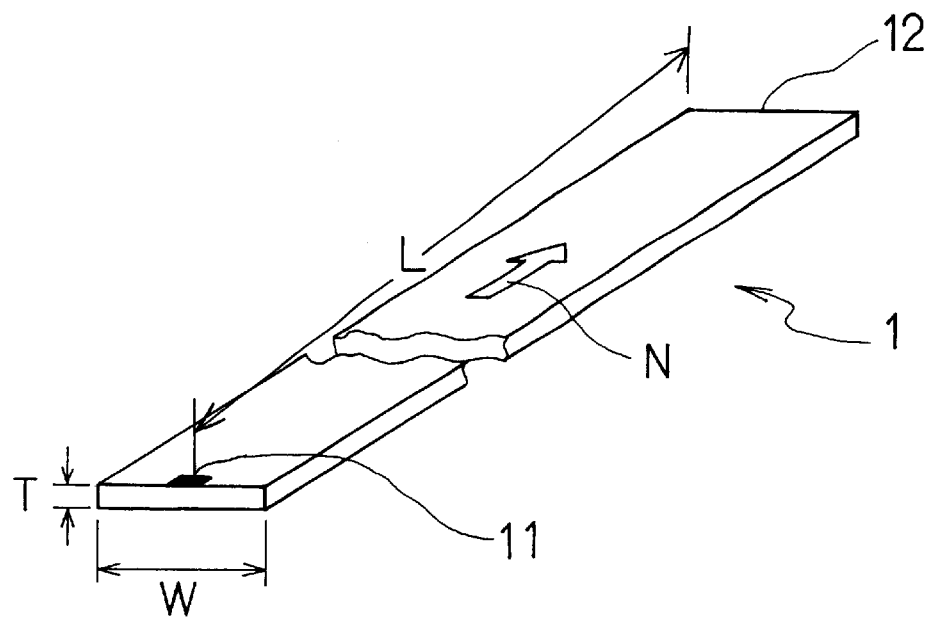
FIG. 1 is a perspective view of one embodiment of a resin molded article.
Figure 2:
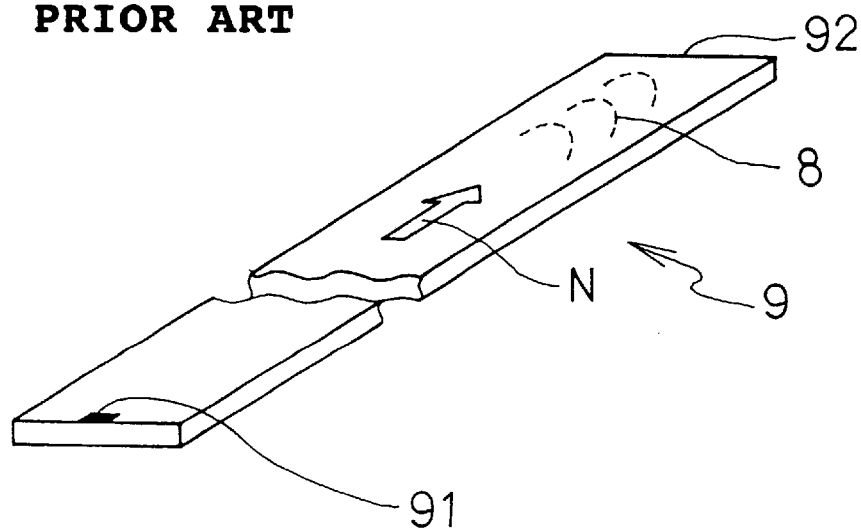
FIG. 2 is a perspective of the prior art resin molded article.
Figure 3:
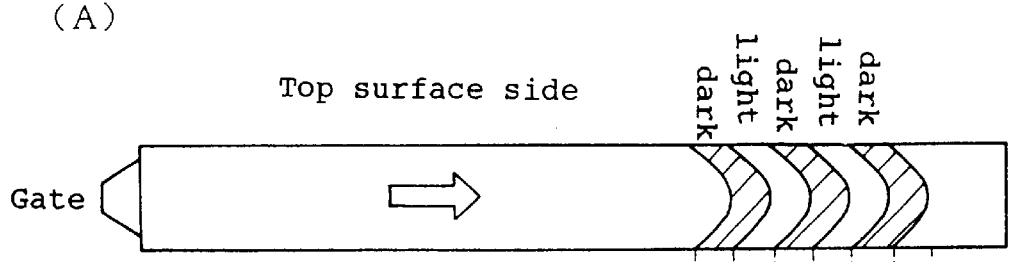
FIG. 3 is an illustration of the state of flow mark development on (A) the face and (B) the back of the prior art resin molded article.
Figure 4:
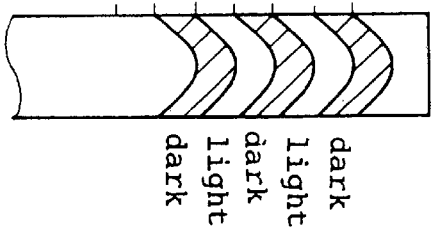
FIG. 4 is an illustration of the amount of a glitter material, both concentration and pale color, and the state of flow mark formation in the prior art resin molded article.

In the present invention, the resin molded article has the molding ration L/T of not less than 100. Examples of such resin molded article are sidemole, garnish lockermole, bumper, pillar, wheel cap, back panel and air spoiler for automobiles. This molding ratio of not less than 100 is contrasted to the conventional upper limit of the molding ration L/T which is usually 1000.

The resin molded article of the present invention is also directed to an injection-molded article, molded by injecting a thermoplastic resin composition containing glitter material into a cavity that has the surface corresponding the external shape of the molded article.

In the present invention, an average particle size of the glitter material that is added in the thermoplastic resin composition is greater than 10 μm and less than equal to 200 μm. When the average particle size is less than 10 μm, the glitter material becomes too fine, and the glitter may easily deviate in the resin molded article. Further, the glittering characteristic may be insufficient.

On the other hand, when the average particle size exceeds 200 μm, the glitter material particles become too large, easily resulting in distortion and breakage of flow at the front portion as described in the prior art. Such a distortion and breakage may lead to formation of a flow mark.

Examples of the synthetic resin are a single resin, such as polypropylene, polyethylene, polystyrene, acrylonitrile-styreno, acrylonitrile-butadiene-styrene, acrylonitrile-(ethylene-propylene)-styrene, or acrylonitrile-(ethylene-propylene-diene terpolymer)-styrene, acrylonitrile-acrylic-styrene, polyamide, acrylate, polycarbonate, polyacetal, polyvinyl chloride, polyphenylene oxide, polyethylene terephtalate, polybutylene terephtahlate, and ionomer; and a mixture of a plurality of synthetic resins such as polypropylene/polyamide, polycarbonate/acrylonitrile-butadiene-styrene, polyphenylene oxide/polystyrene and the like.

Among them, polypropylene is most preferable from the viewpoint of moldability and cost.

It is preferable that the thermoplastic resin composition is a single resin composition containing no inorganic reinforcing agent and no bulking agent and that the content of the glitter material is not less than 0.05 to less than 4 parts by weight relative to the synthetic resin.

The single resin composition refers to a thermoplastic resin composition in which an inorganic reinforcing agent and a bulking agent is not mixed into a synthetic resin. If necessary, a small amount of a colorant may be added.

In a case of the single resin composition, it is preferred that the content of the glitter material is less than 4 parts by weight relative to the synthetic resin. When the content exceeds 4 parts by weight, a flow mark may form. The lower limit is preferably 0.05 part by weight in order to attain the glitter feeling. A range of 0.1 to 3 parts by weight is further preferable.

It is also preferable that the thermoplastic resin composition is a conjugated resin composition containing an inorganic reinforcing agent and/or a bulking agent, and the content of the glitter material is greater than equal to 0.05 to less than 5 parts by weight relative to the synthetic resin.

The conjugated resin composition refers to a thermoplastic resin in which the above inorganic reinforcing agent and/or bulking agent are mixed therein. If necessary, a small amount of a colorant is added thereto.

Examples of the inorganic reinforcing agent are talc, mica, clay, silica, alumina, calcium carbonate, magnesium carbonate, zinc oxide, titanium oxide, calcium oxide, magnesium oxide, calcium hydroxide, magnesium hydroxide, aluminium hydroxide, calcium sulfate, barium sulfate, basic magnesium sulfate, calcium silicate, glass, potassium titanate and aluminate borate in the form of fiber, whisker, flake or powders.

In the conjugated resin composition, it is preferable that the glitter material be less than 5 parts by weight. When the content is 5 parts by weight or more, a flow mark may form. The lower limit is preferably 0.05 part by weight in order to attain a glitter feeling. A range of 0.1 to 4 parts by weight is further preferable.

As the glitter material, one or more of the following may be used: aluminum powders, brass powders, mica, pearlescent pigment made of mica, flaky glass powders, metal plating powders and metal coating powders.

Examples of the colorant are organic pigments such as phthalocyanine blue, cyanine green, indanthrene, azo, anthraquinone, perylene, perynone, quinacridone, isoindolinone, thioindigo, dioxazine and the like; inorganic pigments such as titanium oxide, titan yellow, red iron oxide, calcinated pigment, carbon black and the like; and dyes such as phthalocyanine, anthraquinone, perylene, perynone and the like. Additives such, as antioxidant, ultraviolet-ray absorbing agent, silane coupling agent and the like, and dispersing agents, such as metal soap, low-molecular polyolefin and the like may be added. Their content is, but is not limited to, less than equal to 3% by weight according to the conventional method.

According to the present invention, a blend may be directly molded in conjunction with the molding of the resin molded article, such that each component in the thermoplastic resin composition reaches the required amount in the final molded article. Alternatively, a compound can be prepared by pre-blending with an extruder to obtain pellets, and this may be used for molding. Yet another way is preparing a dry cutter or a master batch to be diluted with a resin for molding.

It is preferable that the thermoplastic resin composition contains a rubber or an elastomer composition. This can lead to an advantage of improved resistance. Examples of the rubber and the elastomer are ethylene-a-olefin rubbers such as EPM (ehtylene-propylene rubber), EBM (ethylene-propylene rubber), EBM (ehtylene-butene rubber) and EOM (ehtylene-octene rubber) and styrene rubbers such as SBR (styrene-butadiene rubber), SBS (styrene-butadiene-styrene), SIS (sytrene-isopropylene-styrene), SEBS (styrene-ethylene-butylene-styrene), SEPS (styrene-ethylene-propylene-styrene) and the like, as well as hydrogenated ones.

EMBODIMENTS

In a first embodiment, a sidemole 1 for automobiles in which the thickness T of the molded article is 0.3 cm, a distance L from a gate position 11 to the remotest position 12 on the molded article is 100 cm, and width W is 5 cm, as shown FIG. 1, was molded using an injection-molding method.

As the synthetic resin, two kinds of PP's (polypropylene), were used: one containing no ethylene (C2 in Table) and the other containing ethylene (C2 is 5 wt %) were used. Polypropylene resin containing C2 is ethylene-propylene block resin. Table 1 shows a thermoplastic resin composition of a single resin composition.

In addition, as the glitter material, aluminium powders (A, B and C in Table) or mica pearlescent pigment, i.e., "Pearl Mica" (D in Table), was used. The aluminium powders A, B and C have average particle size of 10, 30 or 40 $\mu$m, respectively. Pearl Mica D has average particle size of 30 $\mu$m.

Next, Table 1 shows the average particle size of total glitter materials.

With regards to the average particle size of the glitter material, when the glitter material was one kind, the size was its average particle size. When two or more kinds were used, it was calculated according to (average particle size of each glitter material)×(content of each glitter material)/(content of total glitter materials).

The content of the glitter material is an added amount (content) relative to 100 parts by weight of the synthetic resin amount.

Table 2 shows an embodiment where a thermoplastic resin composition is a conjugated resin composition, mixing EPM (ethylene-propylene rubber) as a modifier and talc as a bulking agent into polypropylene resin (C2:5 wt. %). The content of the glitter material is shown parts by weight relative to the conjugated resin composition. Others are the same as those in Table 1.

Although cyanine green and magnesium stearate are added as a colorant and dispersing agent, respectively, to the thermoplastic resin composition at an appropriate amount, they are not added depending upon the object to be used.

Tables 1 and 2 show the flow mark, glitter deviation and glitter feeling regarding the appearance of the above respective resin molded articles.

With regards to the flow mark and glitter deviation, absence is indicated by (O), presence is indicated by (X) and slight presence is indicated by (Δ). With regards to the glitter feeling, presence is indicated by (O) and absence is indicated by (X). Evaluation on the appearance of the resin molded articles was performed by visual observation.

The same Tables also show Comparative Examples.

Table 1 shows that in a case of the single resin composition, the glitter material having average particle size of 10 $\mu$m (Comparative Example 2) caused a bad glitter deviation and glitter feeling, and the glitter material having average particle size of 30 $\mu$m (Comparative Examples 1 and 3) produced a slight flow mark and also a slight glitter deviation at additional of 4 parts by weight.

Next, from Table 2, in a case of the conjugated resin composition, it is seen that slight flow mark is developed and a glitter deviation is also developed even when average particle size of the glitter material is 30 $\mu$m if the content thereof is 5 parts by weight (Comparative Example 4).

Tables 1 and 2 show that in a case of average particle size d of the glitter material of greater than 10 $\mu$m to not greater than 200 $\mu$m, resin molded articles having much excellent appearance can be obtained by inclusion of the glitter material of not greater than 3 parts by weight in the single resin composition and the glitter material of not greater than 4 parts by weight in the conjugated resin composition.

TABLE 1

|  | E1 | E2 | C1 | E3 | C2 | E4 | E5 | C3 | E6 | E7 |
| --- | --- | --- | --- | --- | --- | --- | --- | --- | --- | --- |
| Resin composition | | | | | | | | | | |
| PP (C$_2$ = 0 wt %) | 100 | 100 | 100 | | 100 | 100 | 100 | 100 | 100 | 100 |
| PP (C$_2$ = 5 wt %) | | | | 100 | | | | | | |
| EPM | | | | | | | | | | |
| TARC | | | | | | | | | | |
| Glitter material | | | | | | | | | | |
| A (10 $\mu$m) | | | | | 1 | | | | | 0.1 |
| B (30 $\mu$m) | 1 | 2 | 4 | 2 | | | | | 0.5 | 0.4 |
| C (40 $\mu$m) | | | | | | 1 | | | | |
| D (30 $\mu$m) | | | | | | | 2 | 4 | 0.5 | 0.5 |
| Averaged particle size of glitter material | 30 | 30 | 30 | 30 | 10 | 40 | 30 | 30 | 30 | 28 |
| Appearance | | | | | | | | | | |
| Flow mark | O | O | Δ | O | O | O | O | Δ | O | O |
| Glitter deviation | O | O | Δ | O | X | O | O | X | O | O |
| Glitter feeling | O | O | O | O | X | O | O | O | O | O |

"E": Embodiments of the present invention
"C": Comparative examples

TABLE 2

|  | E8 | E9 | C4 |
| --- | --- | --- | --- |
| Resin composition | | | |
| PP (C$_2$ = 0 wt % | | | |
| PP (C$_2$ = 5 wt % | 70 | 70 | 70 |
| EPM | 20 | 20 | 20 |
| TARC | 10 | 10 | 10 |
| Glitter material | | | |
| A (10 $\mu$m) | | | |
| B (30 $\mu$m) | 2 | 3.5 | 5 |
| C (40 $\mu$m) | | | |

TABLE 2-continued

|  | E8 | E9 | C4 |
|---|---|---|---|
| D (30 µm) | | | |
| Averaged particle size of glitter material | 30 | 30 | 30 |
| Appearance | | | |
| Flow mark | ○ | ○ | Δ |
| Glitter deviation | ○ | ○ | x |
| Glitter feeling | ○ | ○ | ○ |

"E": Embodiments of the present invention
"C": Comparative examples

What is claimed is:

1. A resin molded article comprising:

a single thermoplastic resin composition comprising glitter material mixed into a synthetic resin and being free of an inorganic reinforcing agent and a bulking agent, said glitter material being present in said thermoplastic resin composition in a concentration from at least 0.05 parts by weight to less than 4 parts by weight per 100 parts by weight of said synthetic resin, wherein said resin molded article has a molding ratio L/T of not less than 100, in which L is a distance from a gate position at molding to a remotest position on said resin molded article, and T is a thickness of said resin molded article;

wherein said glitter material has an average particles size d of $10<d\leq 200$ µm;

and wherein said resin molded article is free from flow marks.

2. The resin molded article according to claim 1, wherein said glitter material is selected from the group consisting of aluminum powders, brass powders, pearlescent pigment made of mica, flaky glass powders, metal plating powders and metal coating powders.

3. The resin molded article according to claim 1, wherein said thermoplastic resin composition comprises at least one member selected from the group consisting of a rubber and an elastomer.

4. The resin mold article according to claim wherein 3, wherein said rubber and said elastomer are selected from the group consisting of ethylene-alpha-olefin rubbers and styrene rubbers.

5. The resin molded article according to claim 1, wherein said synthetic resin is one member selected from the group consisting of a single resin and mixture of a plurality of synthetic resins, wherein said single resin is one member selected from the group consisting of polypropylene, polyethylene, polystyrene, acrylonitrile-styreno, acrylonitrile-butadiene-styrene, acrylonitrile-(ethylene-propylene)-styrene, or acrylonitrile-(ethylene-propylene-diene terpolymer)-styrene, acrylonitrile-acrylic-styrene, polyamide, acrylate, polycarbonate, polyacetal, polyvinyl chloride, polyphenylene oxide, polyethylene terephthalate, polybutylene terephthalate, and ionomer; and said mixture of a plurality of synthetic resins is one member selected from the group consisting of polypropylene/polyamide, polycarbonate/acrylonitrile-butadiene-styrene, and polyphenylene oxide/polystyrene.

6. A resin molded article comprising:

a single thermoplastic resin composition comprising glitter material mixed into a conjugated synthetic resin, an inorganic reinforcing agent, and a bulking agent, said glitter material being present in said thermoplastic resin composition in a concentration from at least 0.05 parts by weight to less than 4 parts by weight per 100 parts by weight of said synthetic resin, wherein said resin molded article has a molding ratio L/T of not less than 100, in which L is a distance from a gate position at molding to a remotest position on said resin molded article, and T is a thickness of said resin molded article;

wherein said glitter material has an average particles size d of $10<d\leq 200$ µm; and wherein said resin molded article is free from flow marks.

7. The resin molded article according to claim 6, wherein said inorganic reinforcing agent is one member selected from the group consisting of talc, mica, clay, silica, alumina, calcium carbonate, magnesium carbonate, zinc oxide, titanium oxide, calcium oxide, magnesium oxide, calcium hydroxide, magnesium hydroxide, aluminum hydroxide, calcium sulfate, barium sulfate, basic magnesium sulfate, calcium silicate, glass, potassium titanate and aluminum borate in the form of one member selected from the group consisting of fiber, whisker, flake and powders.

8. The resin molded article according to claim 6, further including no greater than 3% by weight colorant added to said conjugated resin composition, said colorant being one member selected from the group consisting of organic pigments, inorganic pigments, and dyes, wherein said organic pigments comprise a member selected from the group consisting of phthalocyanine blue, cyanine green, indanthrene, azo, anthraquinone, perylene, perynone, quinacridone, isoindolinone, thioindigo, and dioxazine;

wherein said inorganic pigments comprise a member selected from the group consisting of titanium oxide, titan yellow, red iron oxide, calcinated pigment, and carbon black; and wherein said dyes comprise a member selected from the group consisting of phthalocyanine, anthraquinone, perylene, and perynone.

* * * * *